United States Patent [19]

Bennett

[11] Patent Number: 4,638,612
[45] Date of Patent: Jan. 27, 1987

[54] DOCK SHELTER

[75] Inventor: Mark A. Bennett, Milwaukee, Wis.

[73] Assignee: Kelley Company, Inc., Milwaukee, Wis.

[21] Appl. No.: 816,346

[22] Filed: Jan. 6, 1986

[51] Int. Cl.$^4$ ............................................. E04H 14/00
[52] U.S. Cl. ................................. 52/173 DS; 14/71.5
[58] Field of Search ............................. 14/71.5, 71.3; 52/173 DS; 49/485

[56] References Cited

U.S. PATENT DOCUMENTS

| | | | |
|---|---|---|---|
| Re. 28,391 | 4/1975 | Frommelt et al. | 52/173 DS |
| 3,683,572 | 8/1972 | Alten | 52/173 DS |
| 3,792,559 | 2/1974 | Frommelt et al. | 52/173 DS |
| 3,826,049 | 7/1974 | Frommelt et al. | 52/173 DS |
| 4,038,792 | 8/1977 | McGuire et al. | 52/173 DS X |
| 4,365,452 | 12/1982 | Fillman et al. | 52/173 DS |
| 4,574,543 | 3/1986 | Crosson | 14/71.3 X |

Primary Examiner—Stephen J. Novosad
Assistant Examiner—John F. Letchford
Attorney, Agent, or Firm—Andrus, Sceales, Starke & Sawall

[57] ABSTRACT

A dock shelter to provide a seal between the rear end of a truck and a loading dock. The dock shelter includes a pair of side sections mounted along the sides of a doorway in the dock and each side section is composed of a resilient pad that projects outwardly from the dock. A group of panels are secured in vertically spaced relation to the outer end of each pad and extend in a direction toward the center of the doorway and are disposed at an acute angle with respect to the wall of the dock. An arm is connected to the inner end of each panel and extends outwardly from the panel in a direction away from the dock. The arm is located at an angle of about 90° with respect to the panel. Interconnecting each pad and the inner ends of the panels is a flexible curtain that extends the full height of the side section, while a vertical sealing strip connects the spaced arms. When a truck backs toward the loading dock, the rear end of the truck body will engage the panels of each side section causing the resilient pad to deflect and move the panels into engagement with the side of the truck body and bring the arms into engagement with the end of the truck body. The dock shelter has particular use for providing a seal with truck bodies having outwardly swinging doors in that the sealing strip connecting the arms will bridge the gap between the outwardly swung door.

18 Claims, 6 Drawing Figures

DOCK SHELTER

BACKGROUND OF THE INVENTION

Dock seals and shelters are commonly used to provide a weather seal between the end of a truck body and the loading dock. A dock seal generally comprises a pair of resilient pads which are mounted on the outer wall of the dock, alongside the doorway, and an upper pad that extends across the top of the doorway. When a truck backs toward a loading dock, the end of the truck will engage and compress the pads to provide a weather seal between the body and the dock.

The side pads of the dock seal must necessarily have a substantial width in order to accommodate truck bodies of varying widths, as well as to accommodate driver misalignment as the truck is backed toward the dock. Because of this, the dock seal will normally extend inwardly of the truck body and encroach upon the access to the body. The encroachment of the dock seal into the truck body not only provides a problem when dealing with end loads, but the projecting edge of the dock seal can be accidentally contacted by mechanical material handling eguipment, such as a fork lift truck, causing damage to the seal.

Dock shelters, as opposed to seals, are adapted to engage the outer wall of the truck body to provide a weather seal. In some cases, dock shelters are relatively complex devices requiring electrical or hydraulic power sources to move the panels of the shelter into engagement with the side walls of the truck after the truck as parked in front of the dock.

While a dock shelter can provide an effective seal to a truck body having an overhead door, the conventional dock shelter will not provide a complete seal when used with truck bodies having outwardly swinging doors. In a loading operation, the doors are swung outwardly to the open position where they are substantially flush with the outer surface of the truck body and the side panels of the dock shelter will engage the outwardly swung doors. However, there is a gap between the outwardly swung door and the side of the truck body which will not be sealed by the conventional dock shelter.

SUMMARY OF THE INVENTION

The invention is directed to a dock shelter which provides an effective seal to the end of a truck body, and has particular application for use with truck bodies with swinging doors, for the dock shelter will effectivelv seal the gap between the outwardly swung door and the side wall of the truck body without encroachment upon access to the body.

In accordance with the invention, the dock shelter includes a pair of side sections which are mounted on the outer surface of the dock adjacent the doorway and each side section includes a resilient flexible pad, formed of foam plastic, or the like, which projects outwardly from the dock. A plurality of vertically spaced flexible panels are secured to the outer end of each pad and each panel extends inwardly from the pad toward the center of the doorway and is disposed at an acute angle with respect to the dock. A flexible sealing curtain connects the inner ends of the panels with the pad and extends the full height of the pad.

Mounted on the inner end of each panel is an arm which extends outwardly from the panel in a direction away from the dock and is located at an angle of approximately 90° with respect to the panel. Each panel in conjunction with the arm forms a generally L-shaped structure. A segmented flexible flap interconnects the arms and extends the full height of the pad.

When a truck backs toward the loading dock, the rear end of the truck body will engage the panels, deflecting the pad and panels to thereby move the arms and flap into sealing engagement with the end of the truck body. The flexible segmented flap conforms to the hinges between the truck body and the outwardly swung door to provide an effective weather seal for the gap between the open door and the truck body, and in conjunction with the flexible curtain and side pad, provides a seal between the rear of the respective side wall of the truck and the loading dock wall.

A flexible head curtain connects the upper ends of the side sections of the shelter and is adapted to engage the upper surface of the truck body to provide a weather seal between the upper surface of the body and the dock.

The dock shelter of the invention has a construction such that there is minimum contact by the truck body with fabric materials, so that there is less wear on the shelter, resulting in a correspondingly longer service life.

The flexible resilient pads enable the dock shelter to provide an effective weather seal regardless of the truck body width, the driveway incline, or off-center or skewed positions of the truck body.

The pads serve as a cushioning media to absorb impact of the backing truck and also serve as a spring to return the dock shelter to its original configuration after the truck pulls away from the dock.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
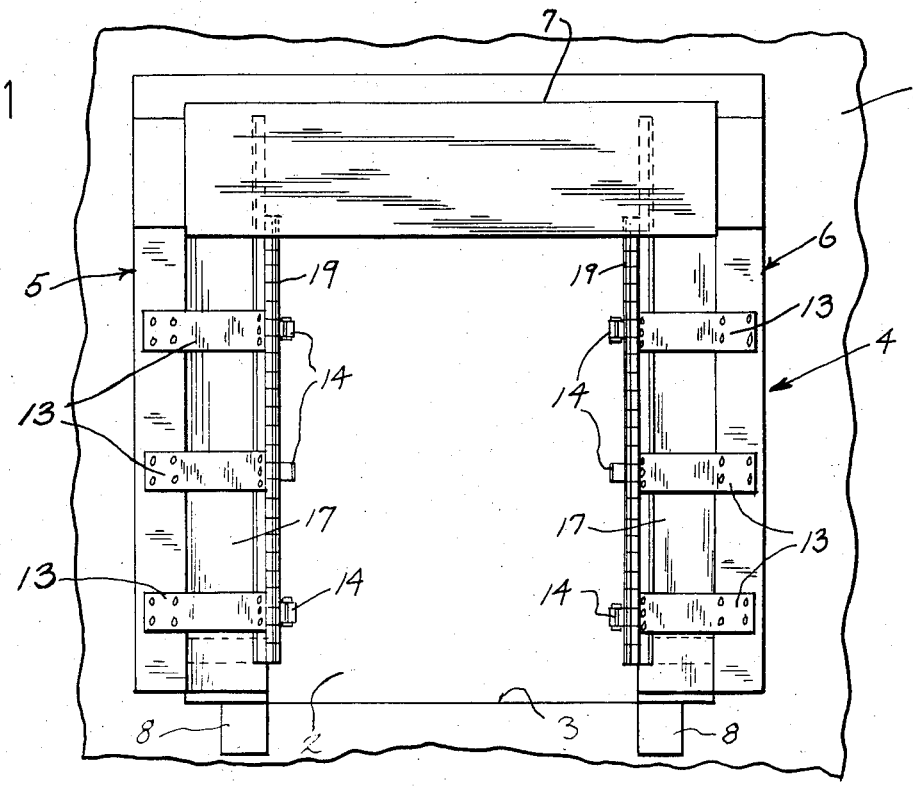
FIG. 1 is a front elevation of the loading dock incorporating the dock shelter of the invention.

FIG. 1 shows a building or other facility 1 having a doorway 2 that borders a loading dock 3. A dock shelter 4 is mounted on the outer wall of the building 1 bordering doorway 2.

Dock shelter 4 is composed of a pair of side sections 5 and 6, which border the sides of doorway 2, and a top or header section 7 which connects the upper ends of side sections 5 and 6.

As shown in FIG. 1, a pair of resilient bumpers 8 are mounted on the outer wall of building 1 beneath dock 3 in position to be engaged by the rear end of a truck as it backs toward the dock.

Side sections 5 and 6 are identical in construction and therefore the following description will be directed to side section 5, it being understood that the construction of side section 6 will be the same.

Figure 3:
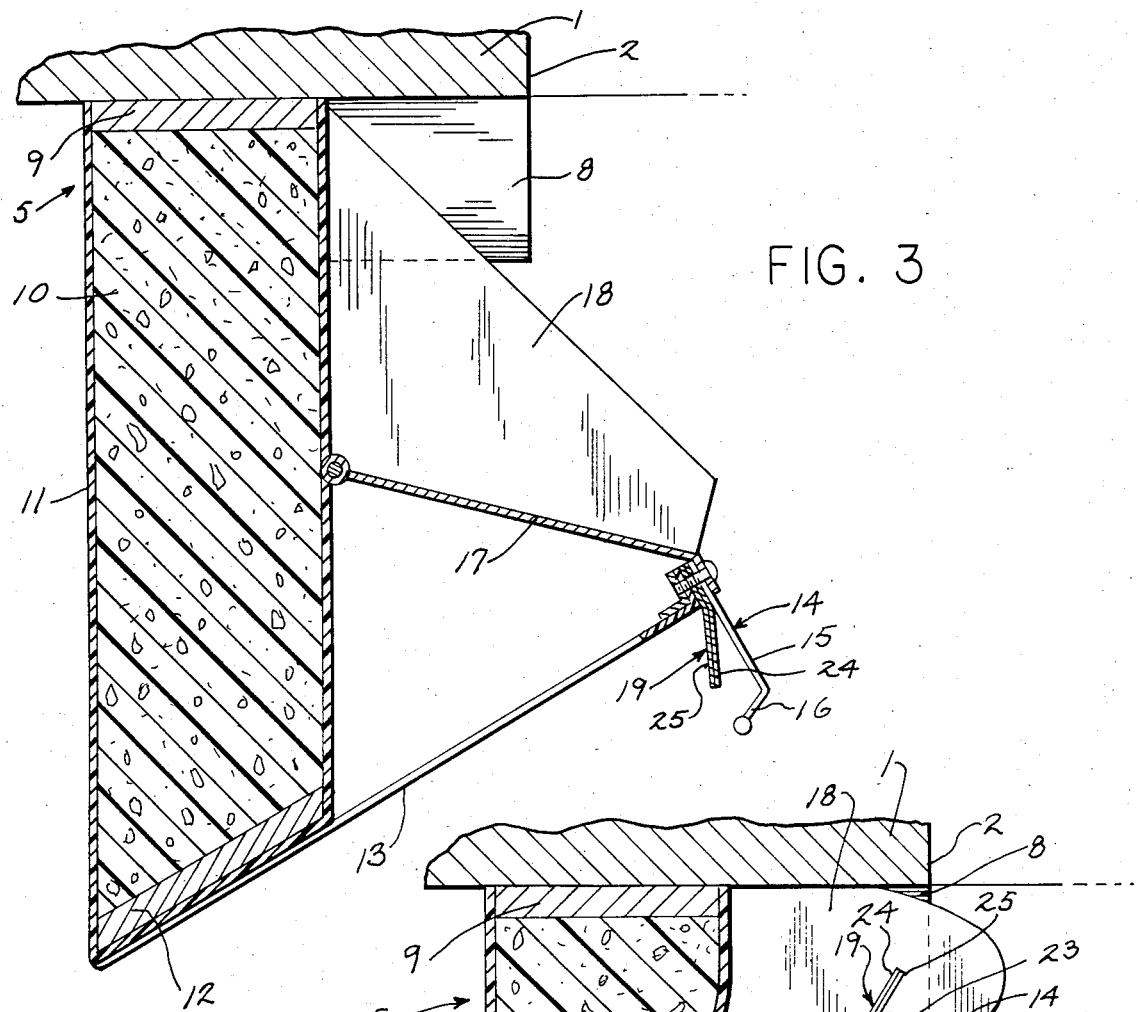
FIG. 3 is a horizontal section taken along line 3—3 of FIG. 2.

Side section 5 includes a mounting plate or frame 9 which is secured to the building 1 and a flexible, resilient pad 10 extends outwardly from the mounting plate 9 and is covered with a fabric covering 11 made of plastic, or the like. As best shown in FIG. 3, the outer end surface of pad 10 is inclined inwardly and a rigid board or panel 12 is secured to the outer end of pad 10.

Figure 2:
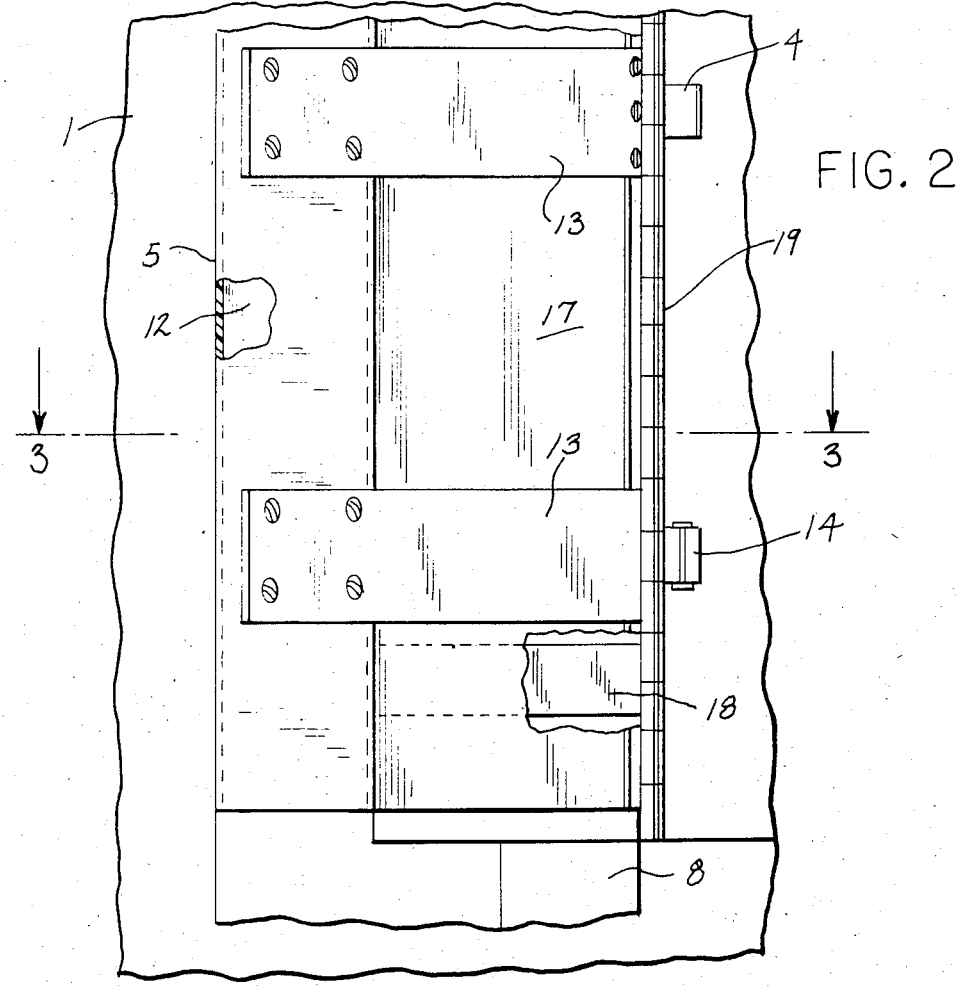
FIG. 2 is a fragmentary enlarged front elevation of a portion of a side panel of the dock shelter.

Mounted on board 12 are a plurality of flexible panels or strips 13 formed of a rigid plastic or the like. While rigid, panels 13 are flexible in a horizontal direction and extend inwardly toward the center of doorway 2 and are located at an acute angle with respect to building 1. Attached to the outer end of each panel 13 is a metal arm 14. Arm 14 includes a main section 15 which extends outwardly from panel 13 at approximately 90°, and an end section 16 which projects outwardly from main section 15 and is provided with an enlarged head. As illustrated in FIG. 2, the panel 13 and arm 14 are an integral structure having a generally L-shape with the panel 13 being substantially longer in horizontal length than arm 14.

As shown in FIG. 1, panels 13 are spaced along the height of the pad 10 and to provide a seal, a fabric curtain or flap 17 is secured between the central portion of pad 10 and the inner ends of panels 13. Curtain 17 extends the full height of pad 10. In addition, a draft pad 18 formed of flexible, resilient material, such as foam plastic, is secured to the lower end of pad 10, as well as to the lower end of flap 17. Pad 18 serves to seal the gap between the lower end of pad 10 and the truck body.

Figure 4:
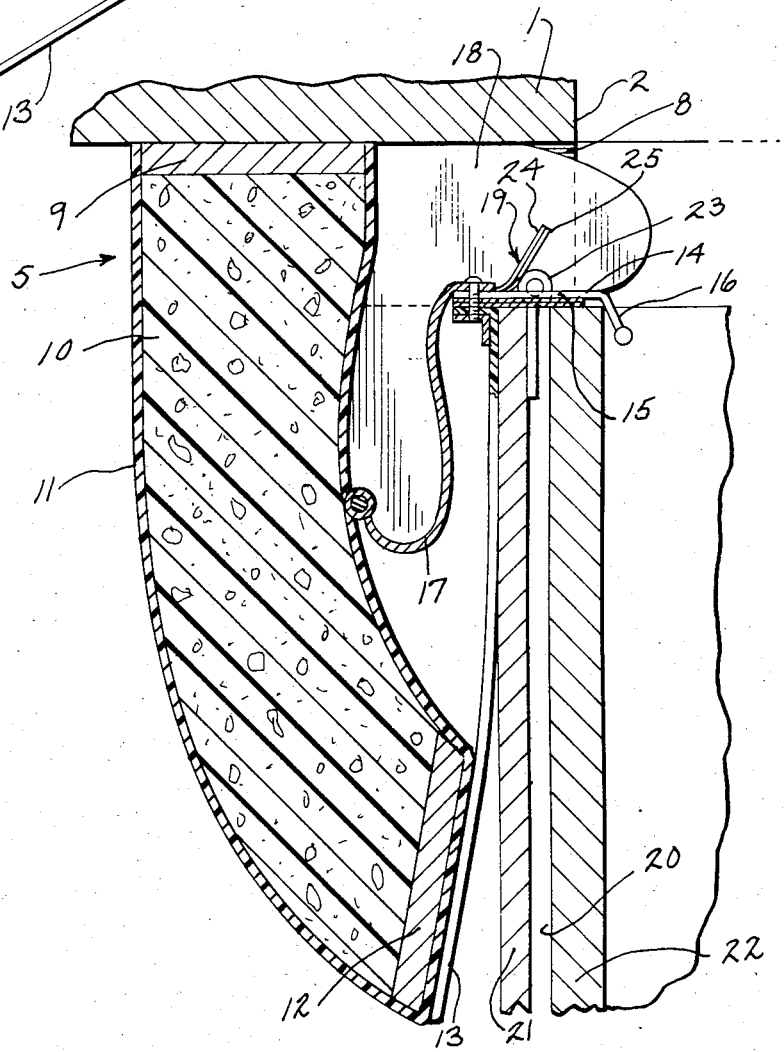
FIG. 4 is a view similar to FIG. 3 showing the dock shelter with a truck in position at the loading dock.
Figure 6:
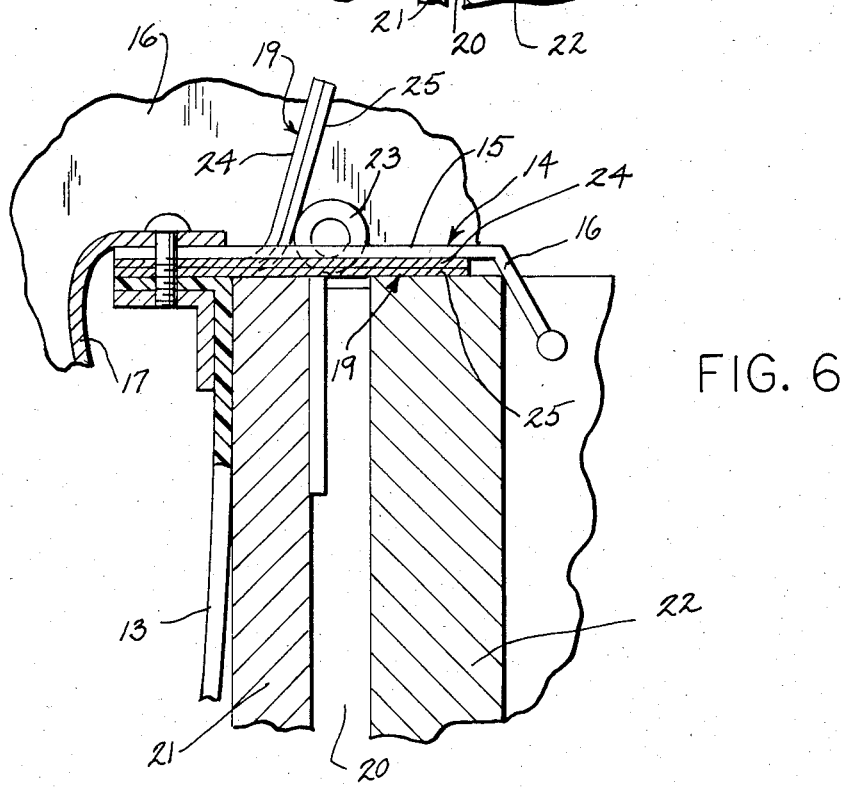
FIG. 6 is an enlarged fragmentary horizontal section showing the manner in which the gap between the truck body and the outwardlv swung door is sealed.

A flexible segmented sealing strip 19 is mounted between the abutting flanges on panels 13 and arms 14 and extends substantially the full height of the side section 5. The flexible strip 19 is adapted to seal the gap 20 between an outwardly swung door 21 and the side of a truck body 22 that is parked in front of the loading dock, as illustrated in FIG. 4. As the door 21 is hinged to truck body 22 through a group of spaced hinges 23, the sealing strip 19 is preferably slit at intervals along its length to accommodate the hinges, as best illustrated in FIG. 6. Strip 19 can be formed of a plastic backing material 24 with an inner layer of carpeting or cushioning material 25.

The top section 7 extends between side sections 5 and 6 and is formed of a wire form frame covered with a plastic or fabric covering. The plastic covering will drape against the top surface of the truck body to provide a seal in this area.

FIG. 3 illustrates side section 5 in its normal position. As a truck backs toward the loading dock, the end of the truck body 22 will engage the panels 13, deflecting pad 10 and moving the panels into engagement with the outer surface of the outswung door 19, as illustrated in FIG. 4. Deflection of pad 10 by the truck body also moves arms 14 into engagement with the end of the truck body, and each sealing strip 19 seals the gap 20 between the door and the truck body, and in conjunction with pad 10 and curtain 17, provides a seal between the rear of the truck body and the loading dock wall, as shown in FIG. 4. The slits in the sealing strip 19 enable the strip to accommodate the hinges 23 which connect the truck body 22 and the door 21.

The shelter of the invention provides an effective weather seal against the end of the truck body and encloses the gap between the truck body and the outwardly swung door, if the truck has swinging doors.

When the truck departs from the loading dock the natural resiliency or spring back of pad 10 and panels 13 will return the side section 5 to its original configuration, as shown in FIG. 3.

Figure 5:
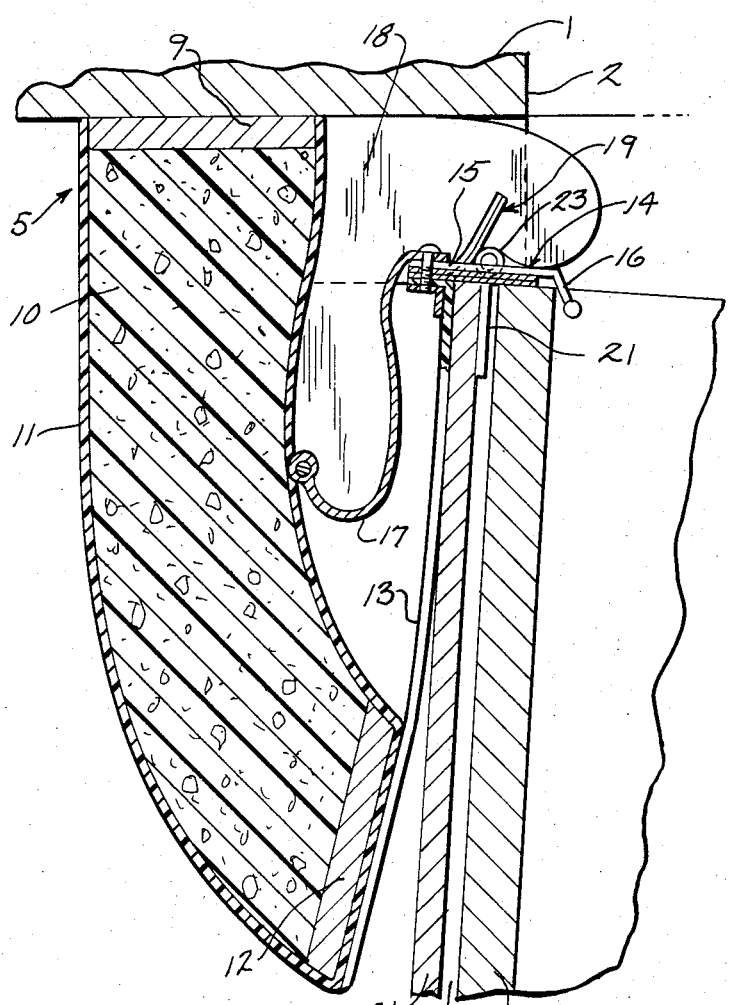
FIG. 5 is a view similar to FIG. 4 showing the dock shelter with a truck in an off-center and skewed position.

FIG. 5 illustrates a situation in which the truck body is located in a skewed relation with respect to the loading dock and is off-center with respect to the doorway 2. As shown in FIG. 5, the flexibility of the pads 10 will bring panels 13, arms 14 and sealing strips 19 into engagement with the end of the truck body, as well as the end of the outswung door, to provide an effective seal.

The dock shelter of the invention will provide a positive weather seal with various sizes of truck bodies, and as shown in FIG. 5, an effective seal is provided even though the truck may be off-center relative to the loading dock or be skewed.

As a truck when backing towards the dock will engage only the panels 13 which are of a relatively hard, but flexible plastic, contact of the truck body with the fabric covering of the pads 10 is minimized, so that the service life of the pads is substantially extended over conventional dock seals or shelters.

While the drawings illustrate a series of panels 13 being mounted to the pad at intervals along the height of the pad, it is contemplated that a single panel 13 could be employed which extends the full height of the pad and similarly, the arms 14 can extend the full height of the pad.

In addition, the drawings illustrate the sealing strip 19 being slit at intervals along its length to accommodate the hinges, in certain installations the sealing strip may take the form of an elongated resilient pad which will flex to accommodate the hinges.

Various modes of carrying out the invention are contemplated as being within the scope of the following claims particularly pointing out and distinctly claiming the subject matter which is regarded as the invention.

I claim:

1. A dock shelter to be mounted alongside the doorway in a dock, comprising a resilient pad mounted on the dock and projecting outwardly from said dock, a flexible panel secured to the outer end of the pad and extending inwardly from the pad toward the center of the doorway and disposed at an acute angle with respect to the dock, an arm connected to the inner end of the panel and extending outwardly in a direction away from the dock, said arm being disposed at an angle of about 90° with respect to said panel, the rear end of a truck backing toward said dock engaging said panel to deflect said pad and thereby move the panel into engagement with the side of the truck and simultaneously move the arm into engagement with the end of the truck body.

2. The dock shelter of claim 1, wherein said pad includes an outer generally vertical surface which is inclined inwardly toward the center of the doorway, said panel being secured flatwise to said surface.

3. The dock shelter of claim 1, and including a plurality of panels spaced along the height of said pad, and an arm associated with each panel, said shelter also including a flexible curtain interconnecting said pad and said arm and extending substantially the full height of said pad.

4. The dock shelter of claim 3, and including a resilient sealing strip extending between said arms.

5. The dock shelter of claim 4, wherein said resilient strip is slit at spaced intervals along its length.

6. A dock shelter to be mounted alongside a doorway in a dock and providing a weather seal with a truck parked in front of the dock, comprising a resilient pad projecting outwardly from the dock adjacent said doorway, a generally L-shaped member carried by the outer end of the pad, said L-shaped member including a first leg having one end secured to the outer surface of said pad and extending inwardly toward the center of the doorway and disposed at an acute angle with respect to said loading dock, said L-shaped member also including a second leg extending outwardly from the opposite end of said first leg and disposed at an angle of about 90° with respect to said first leg, the rear end of a truck body backing toward the dock engaging said first leg to deflect said pad and move said first leg into engagement with the side of the truck body and move said second leg into engagement with the end of said truck body to provide a weather seal between the truck body and the dock.

7. The dock shelter of claim 6, wherein said first leg is flexible in a horizontal direction.

8. The dock shelter of claim 6, wherein said first leg has a subsatntially greater horizontal length than said second leg.

9. The dock shelter of claim 6, and including a flexible sealing strip connected to said second leg and extending substantially the full height of said pad.

10. In combination, a loading dock including a doorway, a dock shelter mounted on the dock and including a pair of side sections disposed adjacent the respective sides of said doorway, each side section including a flexible resilient pad projecting outwardly from the dock, and a generally L-shaped member carried by the outer end of the pad, said L-shaped member including a first leg having one end secured to the outer surface of said pad and extending inwardly toward the center of the doorway and disposed at an acute angle with respect to said loading dock, said L-shaped member also including a second leg extending outwardly from the opposite end of said first leg, the L-shaped member of each side section being disposed to be engaged by the rear end of a sidewall of a truck body backing toward the dock to deflect said pad and move said first leg into engagement with the side of the truck body and move said second leg into engagement with said end of said truck body to provide a weather seal between the truck body and the dock.

11. The combination of claim 10, and including a flexible member connecting the upper ends of said side sections and disposed to engage the upper surface of said truck body to provide a seal between said upper surface and said dock.

12. The construction of claim 10, wherein said second leg is disposed generally normal to said first leg.

13. The combination of claim 10, and including a plurality of said L-shaped members spaced at intervals along the height of said pad, said combination also including a flexible curtain interconnecting said pad and said L-shaped members and extending substantially the full height of said side section.

14. The combination of claim 13, and including a flexible sealing strip connecting the second legs of said plurality of L-shaped members and disposed to engage the end of said truck body.

15. The combination of claim 13, and including a flexible sealing member interconnecting the dock and the lower portions of said pad and said curtain.

16. The combination of claim 15, wherein said sealing member is a resilient pad.

17. In combination, a loading dock including a doorway, a dock shelter mounted on the dock and including a pair of side sections disposed adjacent the respective sides of said doorway, each side section including a flexible resilient pad projecting outwardly from the dock, a plurality of vertically spaced generally L-shaped members carried by the outer end of each pad, each L-shaped member including a first section having one end connected to the pad, said first section extending inwardly toward the center of the doorway at an acute angle to the plane of the dock, said L-shaped member also including a second section connected to the opposite end of said first section and extending in a direction away from said dock, the L-shaped members of each side section being disposed to be engaged by the rear end of a sidewall of a truck body backing toward the dock to deflect said pad and move said first legs into engagement with the side of the truck body and move said second leg into engagement with said end of said truck body to provide a weather seal between the truck body and the dock, a flexible curtain interconnecting said pad and said L-shaped members and extending substantially the full height of said side section, and a flexible sealing strip interconnecting said second sections and extending substantially the full height of said side section, said strip disposed to engage said rear end of said truck body.

18. The combination of claim 17, and including flexible sealing means for sealing the gap between the dock and the lower ends of said pad and said curtain.

* * * * *